(12) United States Patent
Stragier

(10) Patent No.: US 6,471,233 B1
(45) Date of Patent: Oct. 29, 2002

(54) METHOD OF CONVERTING A REFUSE COLLECTION BODY TO A SEMI-TRAILER AND A REFUSE COLLECTION SEMI-TRAILER

(75) Inventor: Marcel G. Stragier, Scottsdale, AZ (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 09/881,454

(22) Filed: Jun. 14, 2001

(51) Int. Cl.[7] .......................... B62D 53/06; B21K 21/16; B21K 23/00
(52) U.S. Cl. ................ 280/415.1; 280/416.1; 280/441.2; 29/897.1; 29/401.1
(58) Field of Search ........................ 280/415.1, 416.1, 280/441.2, 430; 29/897.1, 897.2, 401.1

(56) References Cited

U.S. PATENT DOCUMENTS 5,511,824 A    4/1996   Zanzig et al.

*Primary Examiner*—Daniel G. DePumpo
*Assistant Examiner*—Matthew Luby
(74) *Attorney, Agent, or Firm*—Parsons & Goltry; Robert A. Parsons; Michael W. Goltry

(57) ABSTRACT

A method of converting a refuse collection body into a semi-trailer. A refuse collection body having a front end and a rear end, and a frame extending along a bottom of the body from adjacent the front end to adjacent the rear end is provided. A king pin is mounted to the frame proximate the front end for attachment to a fifth wheel of a tractor and an axle assembly is mounted to the frame proximate the rear end.

14 Claims, 5 Drawing Sheets

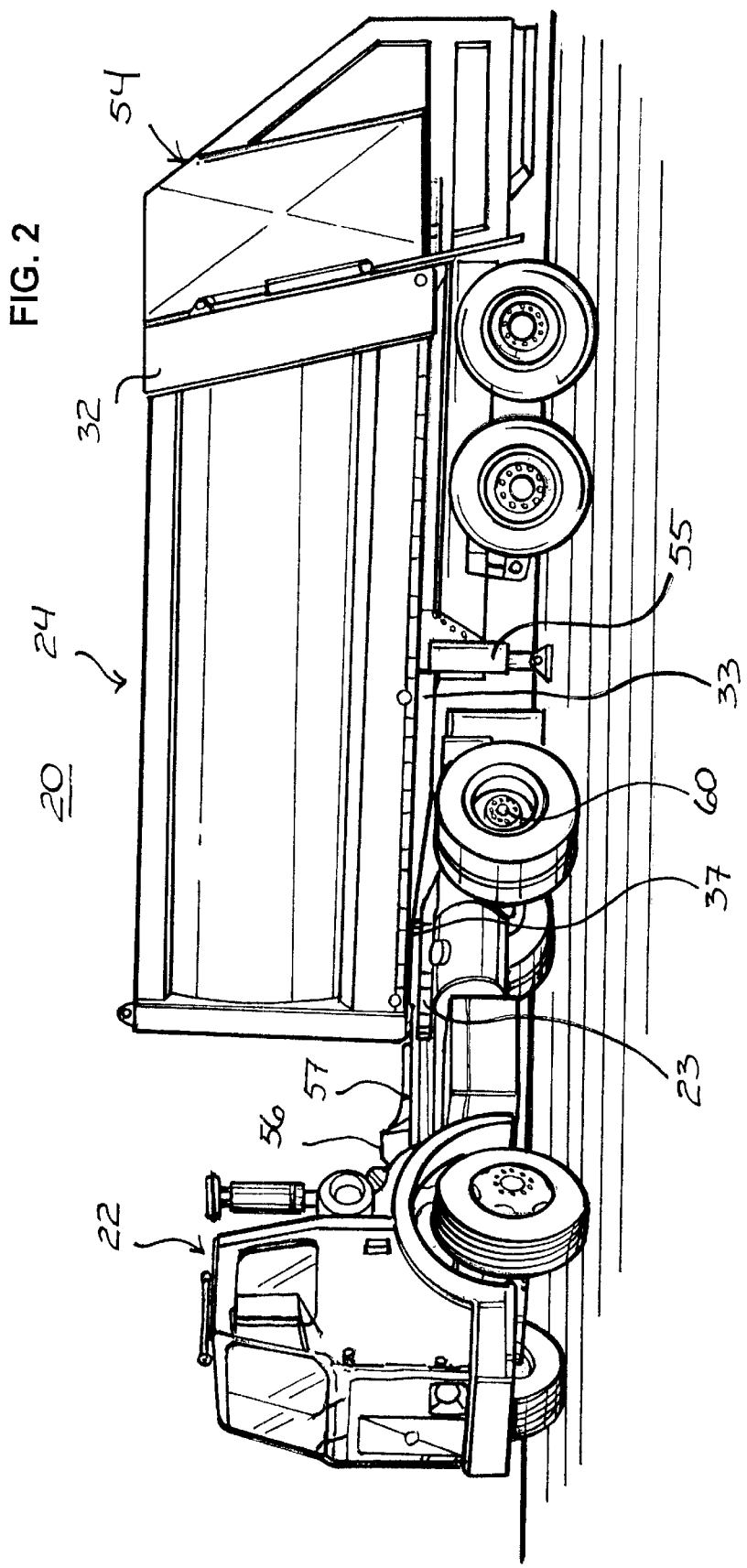

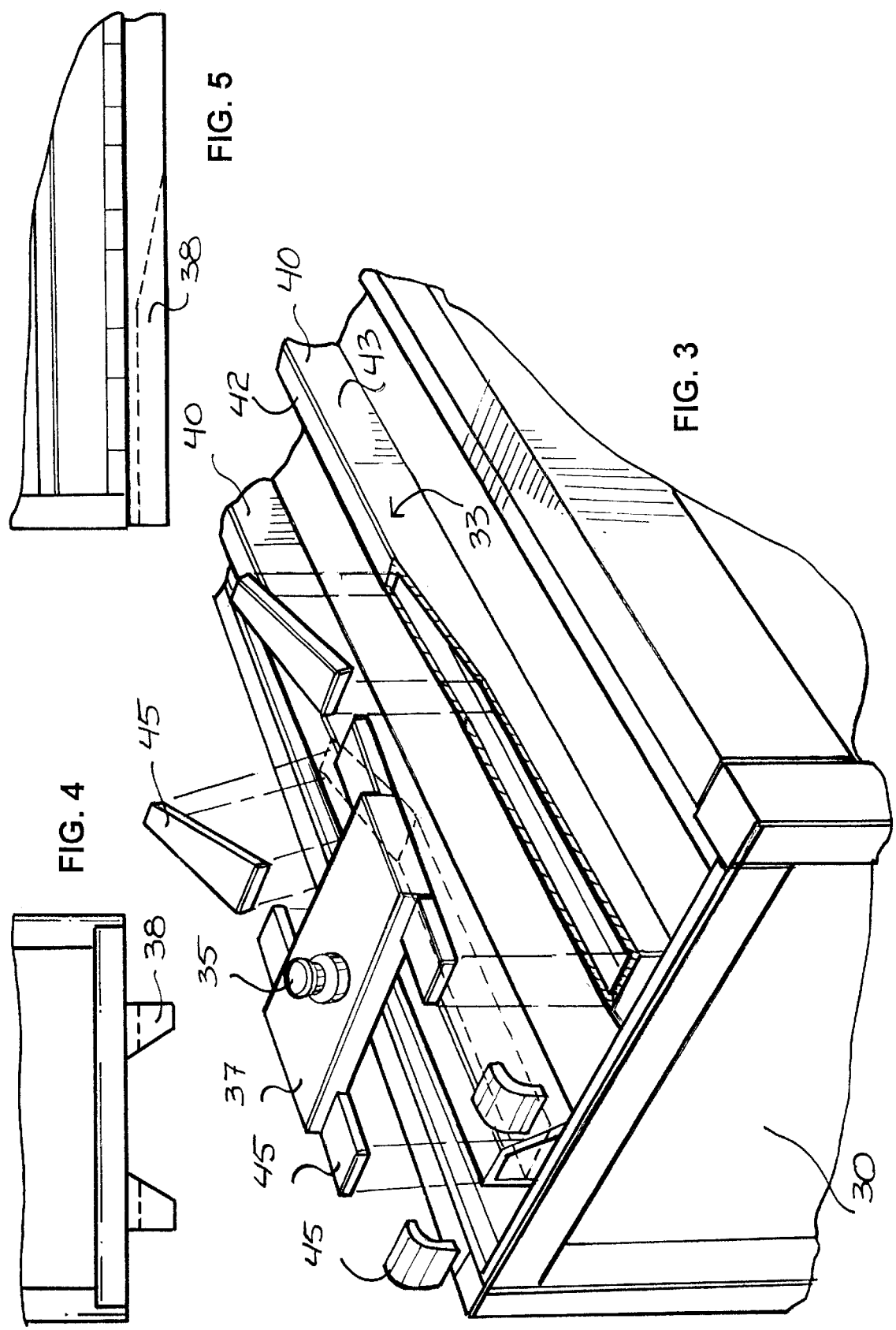

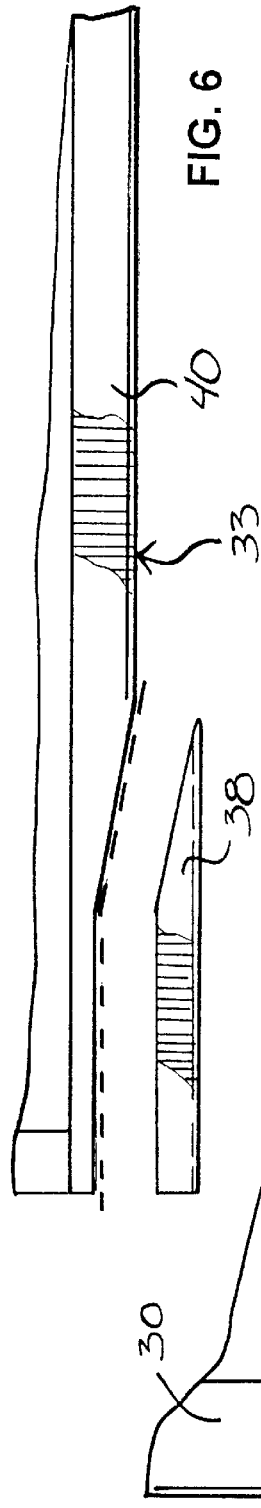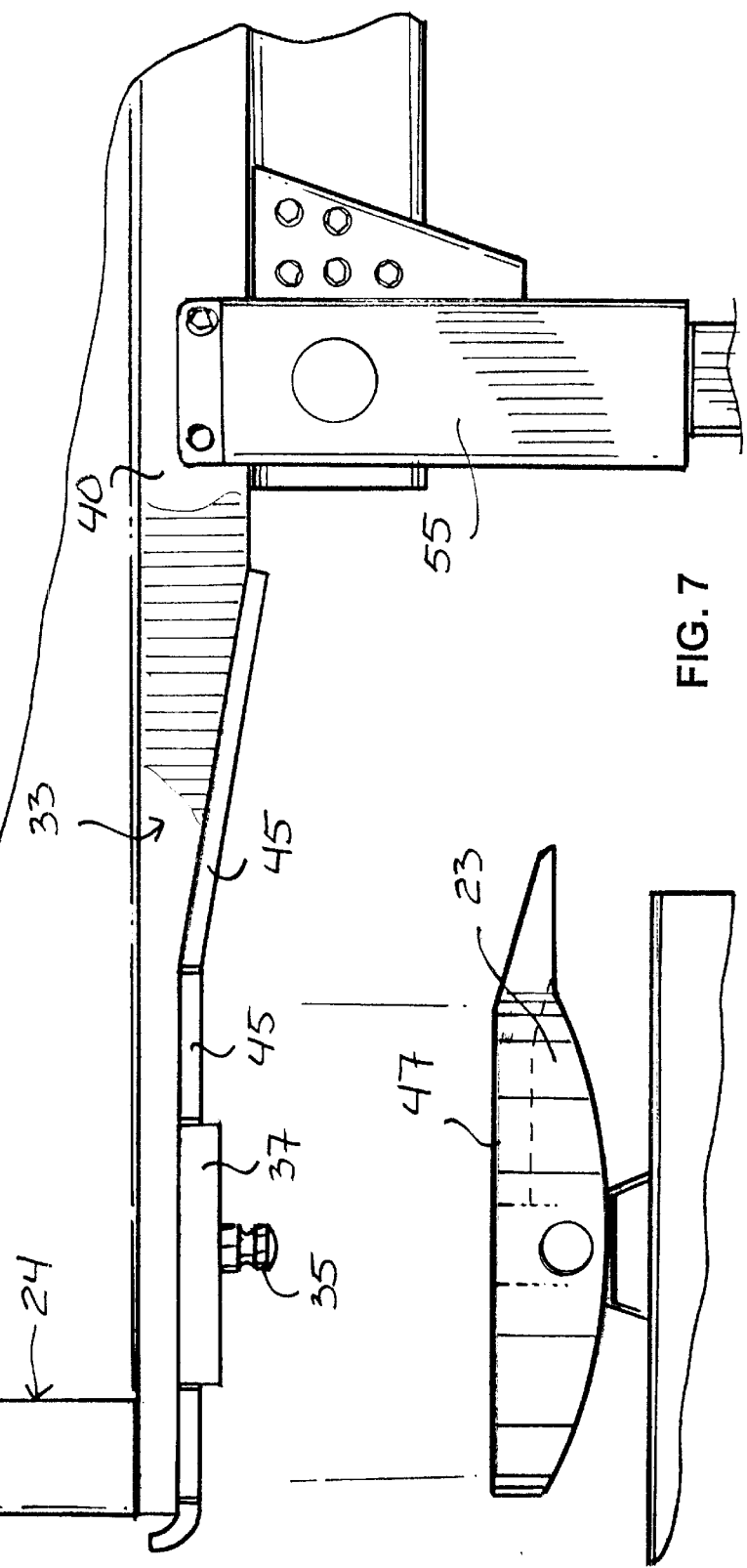

METHOD OF CONVERTING A REFUSE COLLECTION BODY TO A SEMI-TRAILER AND A REFUSE COLLECTION SEMI-TRAILER

FIELD OF THE INVENTION

This invention relates to refuse collection vehicles.

More particularly, the present invention relates to the fabrication of refuse collection semi-trailers.

In a further and more specific aspect, the present invention concerns a method of converting a refuse collection vehicle into a semi-trailer.

BACKGROUND OF THE INVENTION

The collection and removal of refuse, the solid waste of a community, is a major municipal problem. Traditionally, residential refuse, including garbage, trash, and other waste materials, is collected and stored in containers having a capacity of 10 to 30 gallons, although these figures can vary depending on the community. Commercial or industrial refuse generators accumulate refuse in larger heavier containers.

Conventionally, refuse containers are emptied into a refuse collection vehicle which transports the collected refuse to a disposal site such as a land fill, dump, incinerator, etc. The refuse collection vehicle includes a vehicle chassis with a cab mounted at one end and a refuse collection body mounted on the chassis behind the cab. A hopper is typically included, into which refuse is deposited for transfer into the refuse collection body.

Hoppers can be located at the front of the body or the rear. Refuse container handling devices are often used to deposit refuse from the containers into the hoppers. Front loaders and side loaders typically deposit refuse into a hopper located at the front of the vehicle. Rear loading vehicle are often manually loaded but may also be loaded by various mechanical devices.

Refuse collection vehicles typically must travel quite a distance to reach a disposal site. As sites closer to city centers become full or operate at capacity, new sites are opened further away from the areas of refuse collection. Because landfill regulations increase the cost of preparation and closing, the trend is for fewer disposal sites at greater distances apart. This increases the travel time needed to dispose of refuse. Conventional refuse collection vehicles are limited in the amount of refuse they can carry by the weight supported by the rear axles. This is particularly troublesome in rear loading vehicles in which the heavy rear loading hopper mechanism is positioned behind the rear axles. Thus a larger proportion of the weight is supported by the rear axle reducing load capacities. A longer vehicle will carry a larger load, but once the weight limit on the rear axle is reached, more space becomes irrelevant. Additionally, a longer vehicle will become unwieldy and difficult to maneuver.

These problems have been solved by the use of semi-trailer refuse collection vehicles as disclosed in U.S. Pat. No. 5,551,824, entitled "Articulated Refuse Collection Apparatus" filed in July 1994. This reference teaches the use of semi-trailers to provide larger carrying capacity as well as greater maneuverability. However, manufacturing of these semi-trailers can be very expensive. Manufacture of semi-trailers require retooling of equipment and establishment of new production lines. Many municipalities and companies are not interested in renovating their fleets of refuse collection vehicles due to these costs involved.

It would be highly advantageous, therefore, to remedy the foregoing and other deficiencies inherent in the prior art.

Accordingly, it is an object the present invention to provide a method of converting a refuse collection body into a semi-trailer.

SUMMARY OF THE INVENTION

Briefly, to achieve the desired objects of the present invention in accordance with a preferred embodiment thereof, provided is a method of converting a refuse collection body into a semi-trailer. A refuse collection body having a front end and a rear end, and a frame extending along a bottom of the body from adjacent the front end to adjacent the rear end is provided. A king pin is mounted to the frame proximate the front end for attachment to a fifth wheel of a tractor and an axle assembly is mounted to the frame proximate the rear end.

In a preferred embodiment, the frame is shaped proximate the front end to form a contour of the frame substantially matching a surface of the fifth wheel of a tractor. Shaping the frame includes removing portions thereof and affixing cover portions. The frame includes spaced apart, elongated hollow members each having a bottom wall and sidewalls, and the step of removing portions of the frame includes removing a portion of the bottom wall and portions of the sidewalls. Cover portions are then affixed to the remaining portions of the sidewalls forming another bottom wall.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 2 is a perspective view of a refuse collection vehicle including a refuse collection body converted into a semi-trailer according to the present invention;

FIG. 3 is an inverted perspective of a portion of an underside of a refuse collection body showing the shaping of the frame and mounting of a king pin;

FIG. 4 is a front plan of the refuse collection body being converted;

FIG. 5 is a side plan of the refuse collection body being converted showing the portions of the frame to be removed;

FIG. 6 is a side plan of the refuse collection body of FIG. 5 showing the portions of the frame removed;

FIG. 7 is a side plan of a portion of the converted refuse collection body in conjunction with a fifth wheel;

DETAILED DESCRIPTION OF A PREFERRED EMBODIMENT

Figure 1:
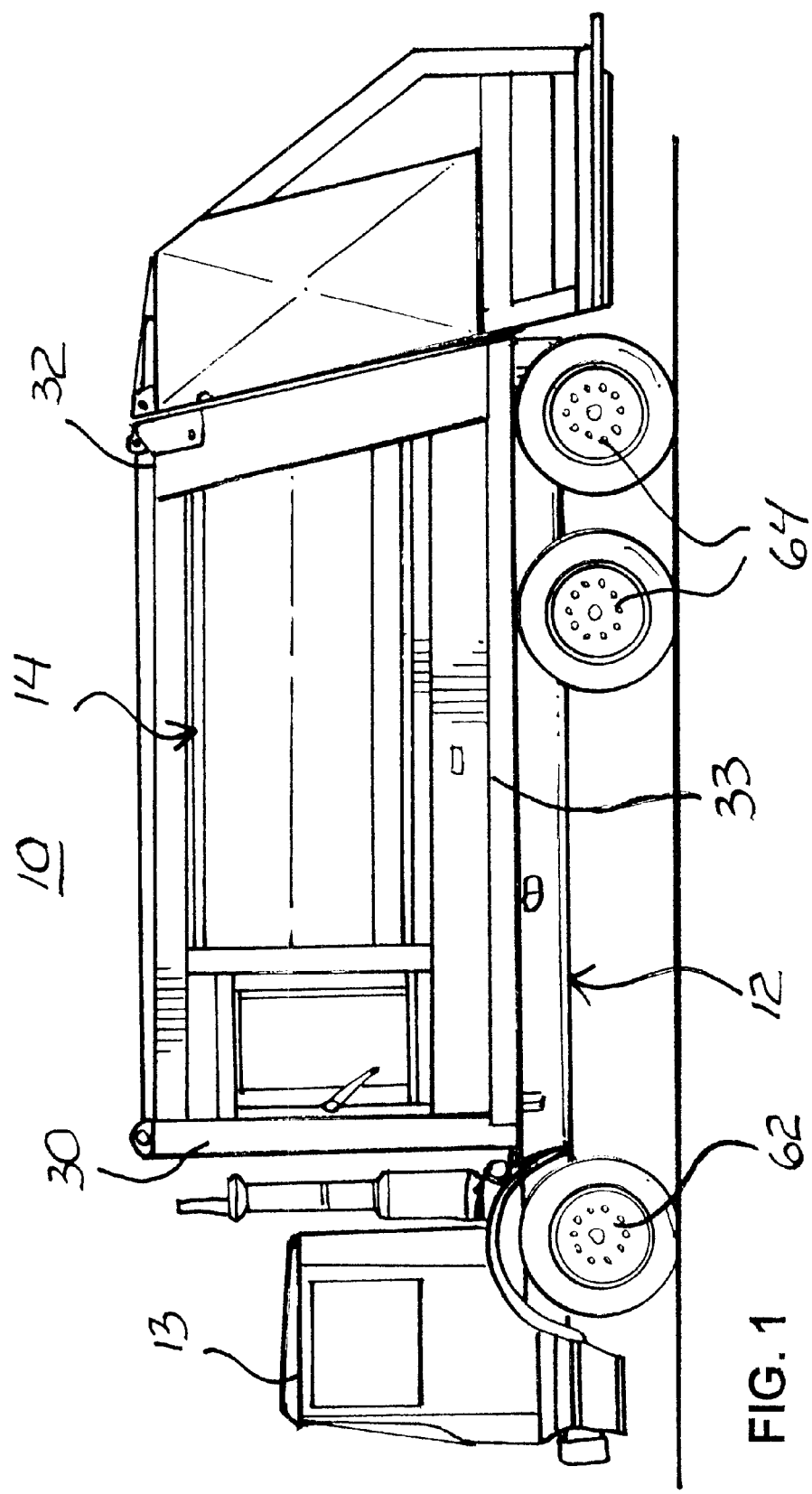
FIG. 1 is a side plan of a conventional refuse collection vehicle.

Turning now to the drawings in which like reference characters indicate corresponding elements throughout the several views, attention is directed to FIG. 1 which illustrates a refuse collection vehicle generally designated 10. Refuse collection vehicle 10 is a conventional refuse collection vehicle including a chassis 12 carrying a cab 13 at a forward end and a refuse collection body 14 rearward of cab 13. Refuse collection body 14 is a rear loading body including a hopper and compactor at the rear end thereof, extending rearwardly of the frame. It will be readily apparent to those skilled in the art that refuse collection body 14 can include a hopper and compactor at the forward end and a loading mechanism such as a side loading mechanism or front loading mechanism.

Turning to FIG. 2, a refuse collection vehicle 20 constructed according to the present invention, is illustrated. Vehicle 20 includes a tractor 22 having a fifth wheel 23, and a semi-trailer 24. As will become apparent from the following description, semi-trailer 24 is converted from refuse collection body 14 of refuse collection vehicle 10. It should be noted that while the description is focusing on converting the refuse collection body of a refuse collection vehicle into a semi-trailer, a refuse collection body that has been newly constructed can also be converted to a semi-trailer as will be detailed presently. Specifically, a modular construction of refuse vehicles as disclosed in co-pending PCT Patent Application Serial Number PCT/US00/22291, entitled "Refuse Collection Vehicles and Method of Manufacturing", filed Aug. 16, 2000, incorporated by reference herein, can be employed, modified by the present invention to convert the created refuse collection body into a semi-trailer.

With additional reference to FIG. 3, a method of converting a refuse collection body into a semi-trailer begins with providing a refuse collection body such as by removing refuse collection body 14 from chassis 12. Refuse collection body 14 includes a front end 30 and a rear end 32, and a frame 33 extending along a bottom of body 14 from adjacent front end 30 to adjacent rear end 32. A king pin 35 (FIGS. 3 and 7) is mounted to frame 33 proximate front end 30 for attachment to fifth wheel 23 of a tractor 22. Mounting king pin 35 to frame 33 includes coupling a plate 37 to frame 33 and mounting king pin 35 on plate 37.

As a step in coupling plate 37 to frame 33, frame 33 is shaped to form a contour proximate front end 30 substantially matching a top surface of fifth wheel 23 of a tractor 22. Frame 33 includes spaced apart elongated hollow members 40 each having a bottom wall 42 and sidewalls 43. With momentary reference to FIGS. 4–6, frame 33 is shaped by removing portions 38 (indicated by broken lines) including portions of bottom wall 42 and portions of sidewalls 43.

Referring back to FIG. 3, shaping of frame 33 is completed by affixing cover portions 45 to frame 33. Affixing cover portions 45, in effect, forms another bottom wall between the remaining portions of sidewalls 43. Plate 37 is then fastened to cover portions 45, spanning between spaced apart elongated hollow members 40. As can be seen with reference to FIG. 6, shaped frame 33 has a contour which closely matches a top surface 47 of fifth wheel 23.

Figure 8:
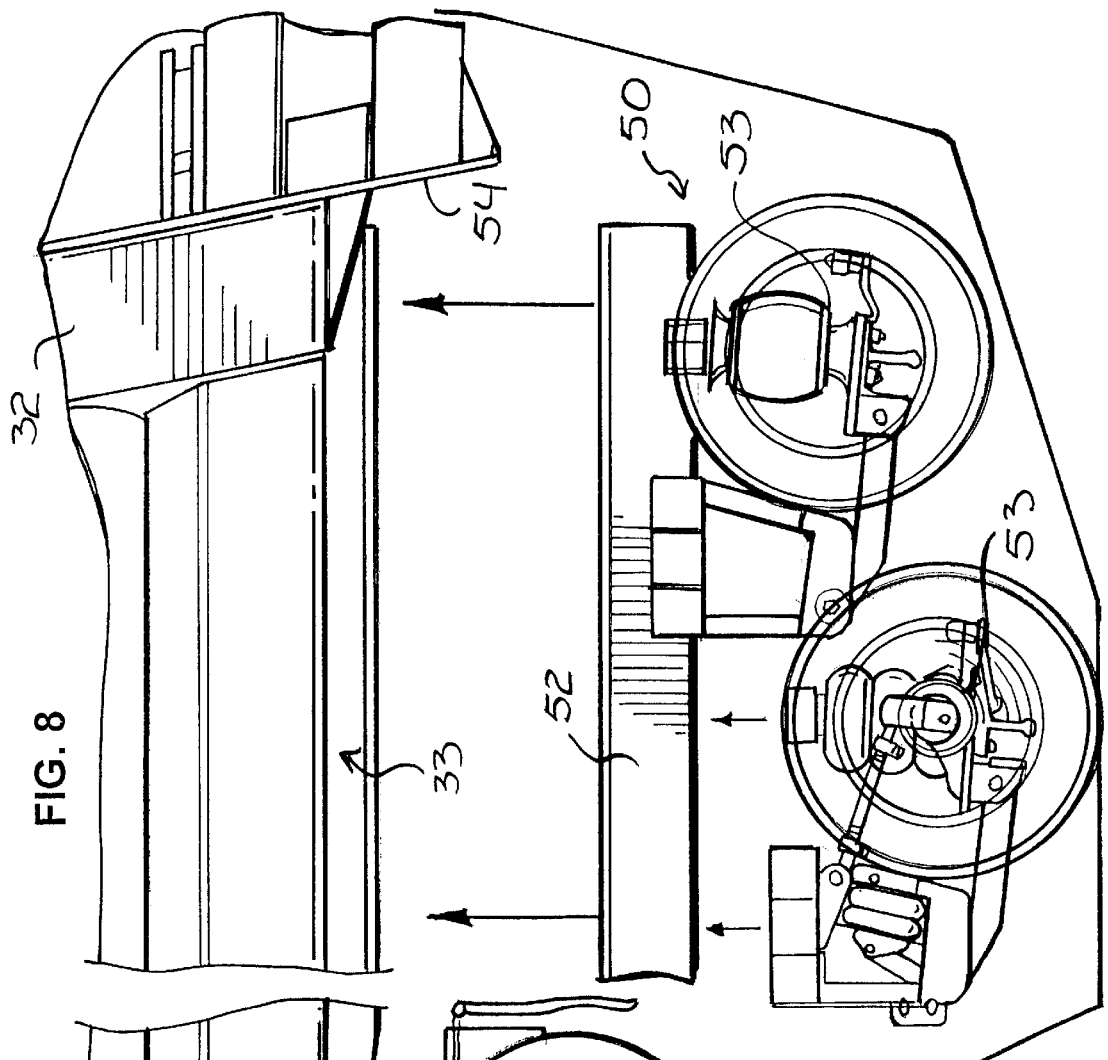
FIG. 8 is a side plan of the converted refuse collection body showing the attachment of an axle assembly.
Figure 9:
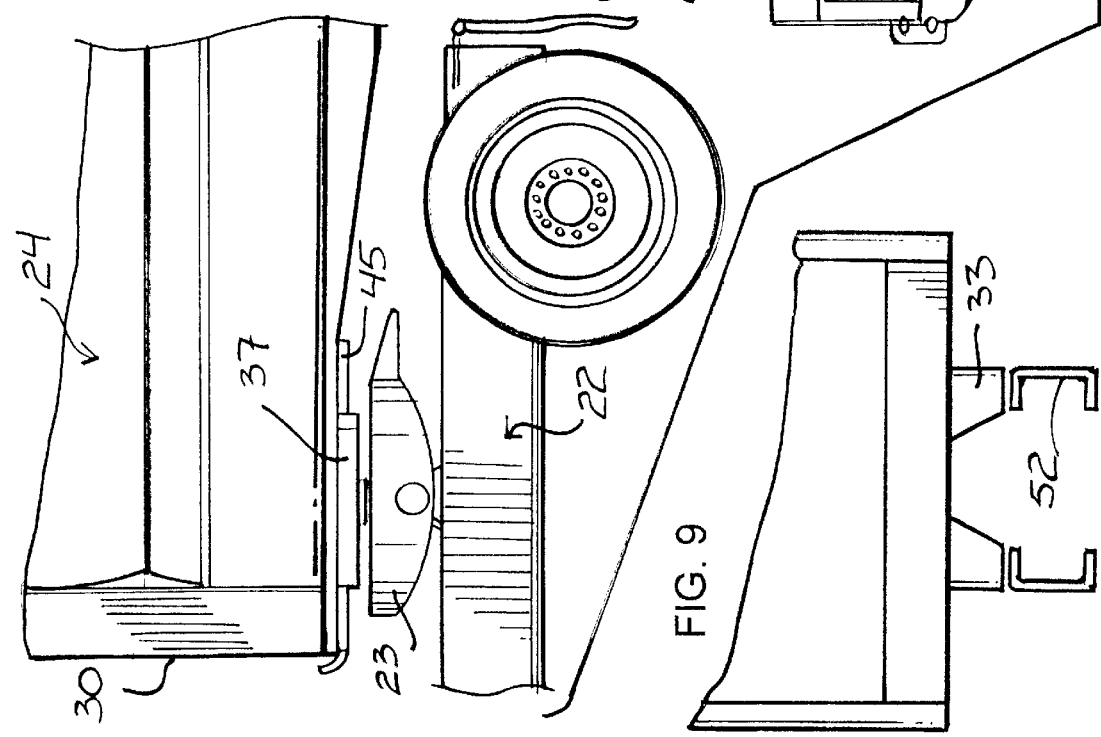
FIG. 9 is an end plan of the converted refuse collection body illustrating the chassis of the axle assembly.

Referring now to FIGS. 7 and 8, an axle assembly 50 is mounted to refuse collection body 14 to complete the conversion to semi-trailer 24. Axle assembly 50 includes a chassis 52 and a pair of axles 53 mounted thereon. Chassis 52 extends from adjacent rear end 32 to a point intermediate rear end 32 and front end 30. Refuse collection body 24 includes a rear loading mechanism 54 coupled proximate rear end 32 and extending rearwardly past frame 33. Other items can be added, such as jack legs 55 and hose couplings 56 for coupling pneumatic and hydraulic hoses 57 to tractor 22.

Thus, a method of converting a refuse collection body into a semi-trailer is provided. The refuse collection body can be newly manufactured or removed from an existing refuse collection vehicle. The refuse collection body can be additionally modified by expanding its length to provide greater load capability. The conversion of a rear loading refuse collection body into a semi-trailer eliminates many of the load problems associated with having a very heavy piece of equipment (rear loading mechanism), extending rearwardly from the rear axles. Referring again to FIGS. 1 and 2, an axle 60 of tractor 22 is positioned closer to axle assembly 50 than a front axle 62 on vehicle 10 is positioned in relation to rear axles 64. Additionally, axle 60 is positioned well behind front end 30 while axle 62 of vehicle 10 is positioned well forward of front end 30. Thus, the load on axle assembly 50 is greatly reduced by shifting much of the weight to axle 60 as opposed to carrying the majority by the rear axles as is the case for vehicle 10. The reduction of load carried by axle assembly 50 enables heavier loads to be transported, and reduces wear on the tires.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of converting a refuse collection body into a semi-trailer comprising the steps of:
   providing a refuse collection body having a front end and a rear end, and a frame extending along a bottom of the body from adjacent the front end to adjacent the rear end;
   mounting a king pin to the frame proximate the front end for attachment to a fifth wheel of a tractor by coupling a plate to the frame and mounting the king pin on the plate; and
   mounting an axle assembly to the frame proximate the rear ends.

2. A method as claimed in claim 1 wherein the step of coupling the plate to the frame includes a step of shaping the frame proximate the front end to form a contour of the frame substantially matching a surface of the fifth wheel of a tractor.

3. A method as claimed in claim 2 wherein the step of shaping the frame includes removing portions thereof and affixing cover portions.

4. A method as claimed in claim 3 wherein the frame includes spaced apart elongated hollow members each having a bottom wall and sidewalls, and the step of removing portions of the frame includes removing a portion of the bottom wall and portions of the sidewalls, and the step of affixing cover portions includes affixing another bottom wall to the remaining portions of the sidewalls.

5. A method as claimed in claim 4 wherein the step of coupling the plate to the frame includes coupling the plate to the another bottom wall of each elongated hollow member.

6. A method as claimed in claim 1 wherein the step of adding an axle assembly includes the steps of, in any convenient order:
   providing a chassis;
   mounting a pair of axles to the chassis; and
   mounting the chassis on the frame, the chassis extending from adjacent the rear end to a point intermediate the rear end and the front end.

7. A method as claimed in claim 1 wherein the step of providing the refuse collection body includes providing refuse collection body having a rear loading mechanism coupled proximate the rear end and extending rearwardly past the frame.

8. A method of converting a refuse collection vehicle into a semi-trailer comprising the steps of:

provoding a refuse collection vehicle having a chassis and a body carried by the chassis, the body having a front end and a rear end, and a frame extending along a bottom of the body from adjacent the front end to adjacent the rear end;

removing the body from the chassis;

mounting a king pin to the frame proximate the front end for attachment to a fifth wheel of a tractor by coupling a plate to the frame and mounting the king pin on the plate; and mounting an axle assembly to the frame proximate the rear end.

9. A method as claimed in claim 8 wherein the step of coupling the plate to the frame includes a step of shaping the frame proximate the front end to form a contour of the frame substantially matching a surface of the fifth wheel of a tractor.

10. A method as claimed in claim 9 wherein the step of shaping the frame includes removing portions thereof and affixing cover portions.

11. A method as claimed in claim 10 wherein the frame includes spaced apart elongated hollow members each having a bottom wall and sidewalls, and the step of removing portions of the frame includes removing a portion of the bottom wall and portions of the sidewalls, and the step of affixing cover portions includes affixing another bottom wall to the remaining portions of the sidewalls.

12. A method as claimed in claim 11 wherein the step of coupling the plate to the frame includes coupling the plate to the another bottom wall of each elongated hollow member.

13. A method as claimed in claim 8 wherein the step of adding an axle assembly includes the steps of, in any convenient order:

providing a chassis;

mounting a pair of axles to the chassis; and mounting the chassis on the frame, the chassis extending from adjacent the rear end to a point intermediate the rear end and the front end.

14. A method as claimed in claim 8 wherein the step of providing the refuse collection vehicle includes providing refuse collection vehicle with a refuse collection body having a rear loading mechanism coupled proximate the rear end and extending rearwardly past the frame.

* * * * *